Oct. 12, 1948. L. O. HABICHT 2,450,891
CLAMP
Filed Nov. 7, 1946
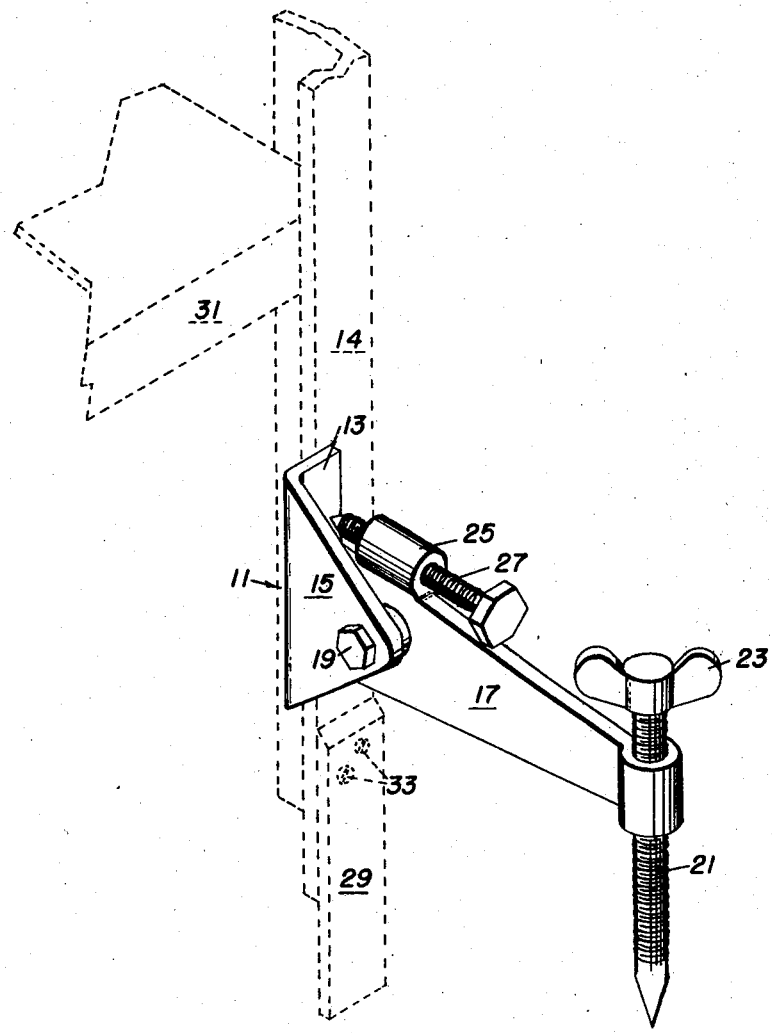
INVENTOR.
LOUIS O. HABICHT
BY *M. O. Hayes*
ATTORNEY Patented Oct. 12, 1948

2,450,891

UNITED STATES PATENT OFFICE 2,450,891

CLAMP

Louis O. Habicht, Thorofare, N. J.

Application November 7, 1946, Serial No. 708,369

5 Claims. (Cl. 248—229)

(Granted under the act of March 3, 1883, as amended April 30, 1928; 370 O. G. 757)

This invention relates to improvements in clamps, and objects of the improvement are, first, to provide a clamp of simple and novel construction adapted to adjust an object to a desired position; second, to provide a clamp adapted to secure an object in desired spaced relation to another object; and third, to provide a clamp adapted to level an object.

Further objects and advantages of this invention, as well as its construction, arrangement and operation, will be apparent from the following description and claims in connection with the accompanying drawing, in which the single figure is an isometric view of a clamp secured to an object, showing a preferred embodiment of the invention.

An angle iron 11 is provided with a leg portion 13 having a face adapted to lie contiguous with and engage an object 14 to be secured, and another leg portion 15 adapted to lie at an angle to said object. An arm 17 is secured rotatably at one end to the leg portion 15 by a bolt 19, and carries a screw 21 at an angle to said arm adjacent the distal end of said arm. Said screw 21 is provided with a wing nut 23 to facilitate turning.

A threaded lug 25 is mounted on an edge of said arm adjacent the face of the leg portion 13, and is provided with a clamping screw 27 adapted to retain said object against said face.

When it is desired to secure the object 14 in predetermined spaced relation to another object such as a fixed standard 29 mounted on a flooring (as, for example, when the object 14 is to carry a transverse member 31 at a predetermined height above said floor), the arm 17 is secured at such an angle to the angle iron 11 that the screw 21 extends to the flooring when the said angle iron is secured to the object 14 by the clamping screw 27. Rotation of the wing nut 23 will then adjust the object 14 to desired position, where it can be secured as by screws 33.

Various modifications and changes can be made in the above device without departing from the scope of the invention.

The invention described herein may be manufactured and used by or for the Government of the United States of America for governmental purposes without the payment of any royalties thereon or therefor.

I claim:

1. A clamp comprising an angle iron, an arm secured rotatably to a first leg portion of said angle iron by a bolt adapted to retain said arm at an angle to said leg portion, said arm carrying a first screw distal said angle iron at an angle to said arm, a wing nut adapted to rotate said screw, and a second screw mounted in a lug on an edge of said arm adjacent said angle iron, said second screw being positioned to retain an object between a second leg portion of said angle iron and the point of said second screw.

2. A clamp comprising an angle iron, an arm secured to a first leg portion of said angle iron by a bolt adapted to retain said arm in predetermined position, said arm being rotatable in a plane parallel to the face plane of said first leg portion, said arm carrying a first screw distal said angle iron at an angle to said arm, a wing nut adapted to rotate said first screw, and a second screw mounted in a lug on an edge of said arm adjacent said angle iron and adapted to retain an object between a second leg portion of said angle iron and the point of said screw.

3. A clamp comprising an angle iron, an arm secured to a first leg portion of said angle iron, said arm being rotatable in a plane parallel to the face plane of said first leg portion, said arm carrying a first screw distal said angle iron at an angle to said arm, means to feed said first screw relative said arm, and a second screw mounted in a lug on an edge of said arm adjacent said angle iron, and means to feed said second screw relative the adjacent face of the second leg portion of said angle iron.

4. A clamp comprising an angle iron, an arm secured to a first leg portion of said angle iron, said arm being rotatable in a plane parallel to the face plane of said first leg portion, said arm carrying a first screw distal said angle iron at an angle to said arm and in said plane, means to feed said first screw relative said arm, a second screw mounted in a lug on an edge of said arm adjacent said angle iron and in said plane, and means to feed said second screw relative the adjacent face of the second leg portion of said angle iron.

5. A clamp comprising an angle iron, an arm secured at one end to a first leg portion of said angle iron, said arm being rotatable in a plane parallel to the face plane of said first leg portion, said arm carrying a first screw distal said angle iron normal to the length of said arm and in said plane, means to feed said first screw relative said arm, a second screw mounted in a lug on an edge of said arm adjacent said angle iron, said second screw being disposed parallel to the length of said arm and in said plane, means to feed said second screw relative the adjacent face of the second leg portion of said angle iron, and means to secure said arm against rotation relative said angle iron.

LOUIS O. HABICHT.

REFERENCES CITED

The following references are of record in the file of this patent:

UNITED STATES PATENTS

| Number | Name | Date |
| --- | --- | --- |
| 1,908,470 | Beuttner | May 9, 1933 |